United States Patent

[11] 3,538,822

| [72] | Inventor | Deward W. Gilmer<br>4747 8th Ave. S., St. Petersburg, Florida 33711 |
|---|---|---|
| [21] | Appl. No. | 667,887 |
| [22] | Filed | Sept. 15, 1967 |
| [45] | Patented | Nov. 10, 1970 |

[54] ATTRACTING LIGHT
4 Claims, 2 Drawing Figs.

[52] U.S. Cl. ....................................................... 95/1, 95/11
[51] Int. Cl. ....................................................... G03b 19/00
[50] Field of Search ........................................... 95/1, 11, (Inquired); 240/(Inquired); 340/(Inquired); 40/(Inquired)

[56] References Cited
UNITED STATES PATENTS

| 710,717 | 10/1902 | Sebba and Cohen | 95/1X |
| 2,341,057 | 2/1944 | Muldoon | 240/10.66 |
| 2,776,364 | 1/1957 | Daniels | 240/52.1 |
| 2,781,707 | 2/1957 | Edgerton | 352/200X |
| 3,312,086 | 4/1967 | Casebeer et al. | 240/1.3 |

Primary Examiner—Norton Ansher
Assistant Examiner—Richard M. Sheer
Attorney—Stefan M. Stein ABSTRACT: An independently controlled attracting light for a camera or as an attachment thereto for getting the attention of the subject being photographed. The light is connected to the battery power source of the camera and a switch is connected between the light and the battery power source to actuate the light independently of any other mechanism of the camera.

Patented Nov. 10, 1970

3,538,822

Deward W. Gilmer
INVENTOR.

BY Dominik, Stein + Knachtel
ATTORNEYS

ATTRACTING LIGHT

This invention relates to a camera, and more particularly to a device which can be used in or with a camera for the purpose of attracting the attention of the intended subject, prior to taking a photograph of that subject.

To the dismay of the amateur photographer, many people are ill at ease when being photographed. Unlike the professional model who is capable of producing a smile on command, these people, at best, appear posed or stern. They may even produce a sneer, smirk, or have one or both eyes closed. Often these people are much more photogenic when they are taken by surprise. They appear much more natural and relaxed. Unfortunately, it is difficult to take a picture by surprise.

Another problem in amateur photography, is the difficulty of getting the attention of small children, or pets whereby they will face the camera. The professional photographer, who knows many attention-getting tricks, has overcome these difficulties to a great extent. But the amateur, not having the great amount of experience possessed by a professional, takes many photographs of friends and relatives which, at best, appear to be in a strained attitude.

An object of this invention is to provide a photographic device which will allow the photographer to draw the attention of his subject to his camera immediately prior to taking a photograph.

Another object of the invention is to provide a device of the above character which will enable the photographer to take an unposed picture.

Still another object is to provide a device of the above character which may be incorporated into, added on, or made supplemental to a camera.

Other objects of the invention will in part be obvious and will in part appear hereinafter.

A device has now been found which will aid the amateur photographer in overcoming the aforementioned difficulties. In its broadest aspects, this invention comprises the addition of an independently activated flashing-type light to the structure of a camera of otherwise common design.

The invention accordingly comprises the features of construction, combination of elements, and arrangement of parts which will be exemplified in the constructions hereinafter set forth, and the scope of the invention will be indicated in the claims.

For a fuller understanding of the nature and objects of this invention, reference should be had to the following detailed description taken in connection with the accompanying drawing in which.

Similar reference characters refer to similar parts throughout the several views.

Figure 1:
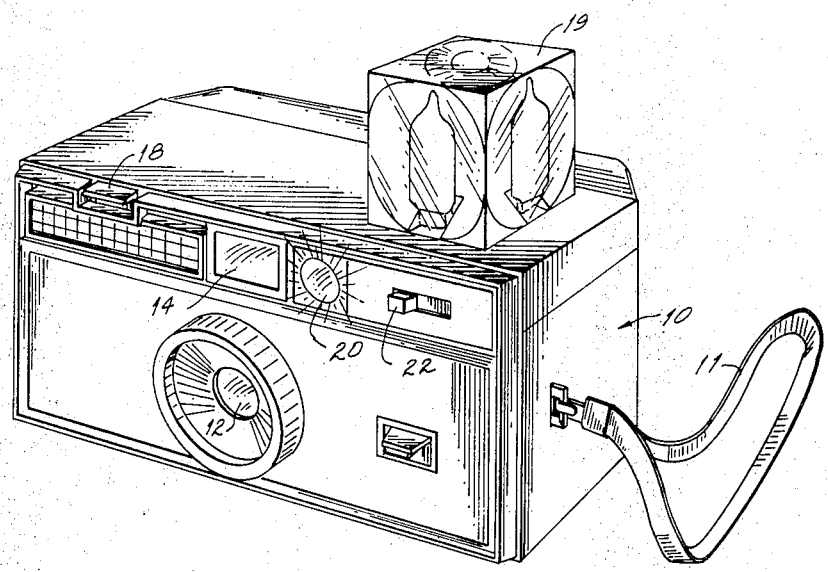
FIG. 1 is a prospective view of a box camera embodying the invention in integral form.

As seen in FIG. 1, the box camera shown has a camera body 10 with a carrying strap 11. Within the body is a shutter lens 12, view finder 14, a shutter activation lever 18, a flash attachment 19, an attracting light 20 and a switch 22 for independently controlling light 20. A second switch 22a may also be used; one for effecting a continuous beam, and the second for a flashing-type beam. Indeed, one switch for the flash and shutter control and for the attracting light, with stops for each, may be used. The light may be of the type which directs a long narrow beam to the potential viewer to to better attract his attention.

When the photographer uses the above camera, he merely focuses it on his intended subject, presses switch 22 to cause the attracting light 20 to repeatedly flash, by any standard method such as by inserting between the flash attachment battery and the attracting light 20, a capacitor, or by inserting a standard flickering light bulb in the camera thereby attracting the eye of the subject being photographed, and then depresses shutter lever 18 thereby taking the intended picture. If the flash attachment 19 is connected, it flashes with the activation of the shutter.

Figure 2:
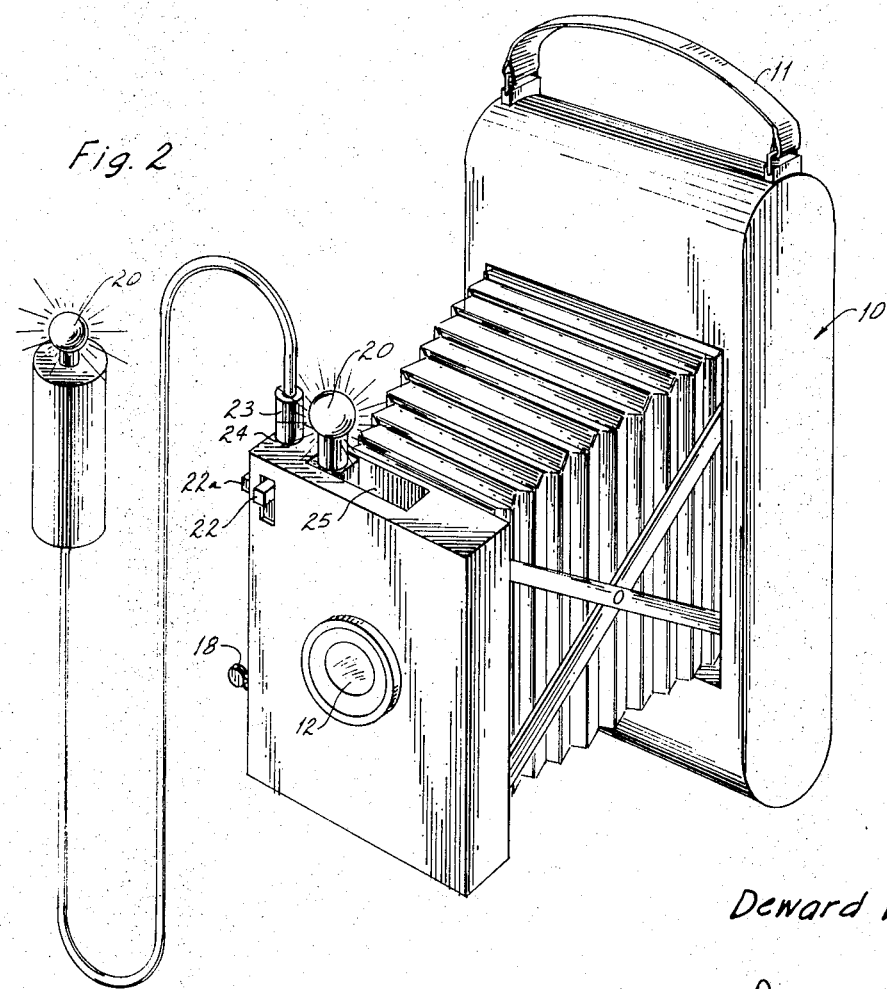
FIG. 2 is a prospective view of a telescoping camera embodying the invention both in integral and remote form.

FIG. 2 shows another embodiment of the invention wherein the attracting light 20 is detachably connected to the camera via jack 23, insertable into socket 24. It is preferably designed to fit into cavity 25 when remote use, such as shown, is not desired. As a remote attracting light, it may be placed to cause the subject to face in any desired direction, rather than merely at the camera as described in the previous embodiment.

Using the invention, an amateur photographer is able to take snapshots in which the subject appears more natural and with his eyes focused on the attracting light.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:

1. In a standard camera comprising: a light proof housing with a shutter, a lens, a shutter and flash attachment actuation means, a flash attachment and a standard battery power source therein, a controlled light source electrically connected to said battery power source and mounted on said camera, and an actuator means electrically connected between said light source and said battery source for actuation of said light source independently of any other mechanism of the camera whereby upon actuation the attention of the person whose picture is to be taken may be gained.

2. The camera combination of claim 1 wherein means are provided in the circuit of said independent light source and said battery to cause said light to flicker.

3. The camera combination of claim 2 wherein said flicker means is a capacitor in series with said light source and said battery.

4. The camera combination of claim 2 wherein said flashing lamp is detachably mounted yet still electrically connected to said camera so that it may be used on the camera or remotely therefrom.